United States Patent
Charzinski

(10) Patent No.: US 7,218,607 B2
(45) Date of Patent: *May 15, 2007

(54) SIGNALING PROXY DEVICE FOR AUTOMATICALLY SETTING UP STANDBY PATHS IN OPTICAL NETWORKS

(75) Inventor: Joachim Charzinski, Oberschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 1086 days.

This patent is subject to a terminal disclaimer.

(21) Appl. No.: 10/215,928

(22) Filed: Aug. 9, 2002

(65) Prior Publication Data

US 2003/0030864 A1    Feb. 13, 2003

(30) Foreign Application Priority Data

Aug. 9, 2001  (DE) ................ 101 39 155

(51) Int. Cl.
*H04J 1/16*   (2006.01)
*H04J 3/14*   (2006.01)
*H04L 1/00*   (2006.01)
*H04L 12/26*  (2006.01)

(52) U.S. Cl. .................................... 370/220

(58) Field of Classification Search ........... 370/220, 370/359, 400, 466, 278, 360, 219, 395, 252; 709/223, 228; 398/58, 51, 45; 455/412, 455/41.2, 41

See application file for complete search history.

(56) References Cited

U.S. PATENT DOCUMENTS

| | | | |
|---|---|---|---|
| 6,757,243 B1 * | 6/2004 | Chaudhuri et al. | ......... 370/221 |
| 6,990,065 B1 * | 1/2006 | Chaudhuri et al. | ......... 370/221 |
| 2003/0031213 A1 * | 2/2003 | Charzinski et al. | ......... 370/539 |

* cited by examiner

*Primary Examiner*—Chi Pham
*Assistant Examiner*—Prenell Jones
(74) *Attorney, Agent, or Firm*—Bell, Boyd & Lloyd LLP

(57) ABSTRACT

A data connection switching unit is provided for use in an optical communication network, as well as an optical communication method and an optical communication network, in which, via a number of interconnected network node devices of an optical transport network, data is transferred to a second transceiver via a first data connection via optical signals, wherein a data connection switching unit is connected between the first transceiver and one of the network node devices, which independently instigates the setting up of a second data connection between first and second transceivers by virtue of the fact that it sends a data connection setup signaling signal to the corresponding network node device in which information referring to the desired course of the second data connection is included.

14 Claims, 4 Drawing Sheets

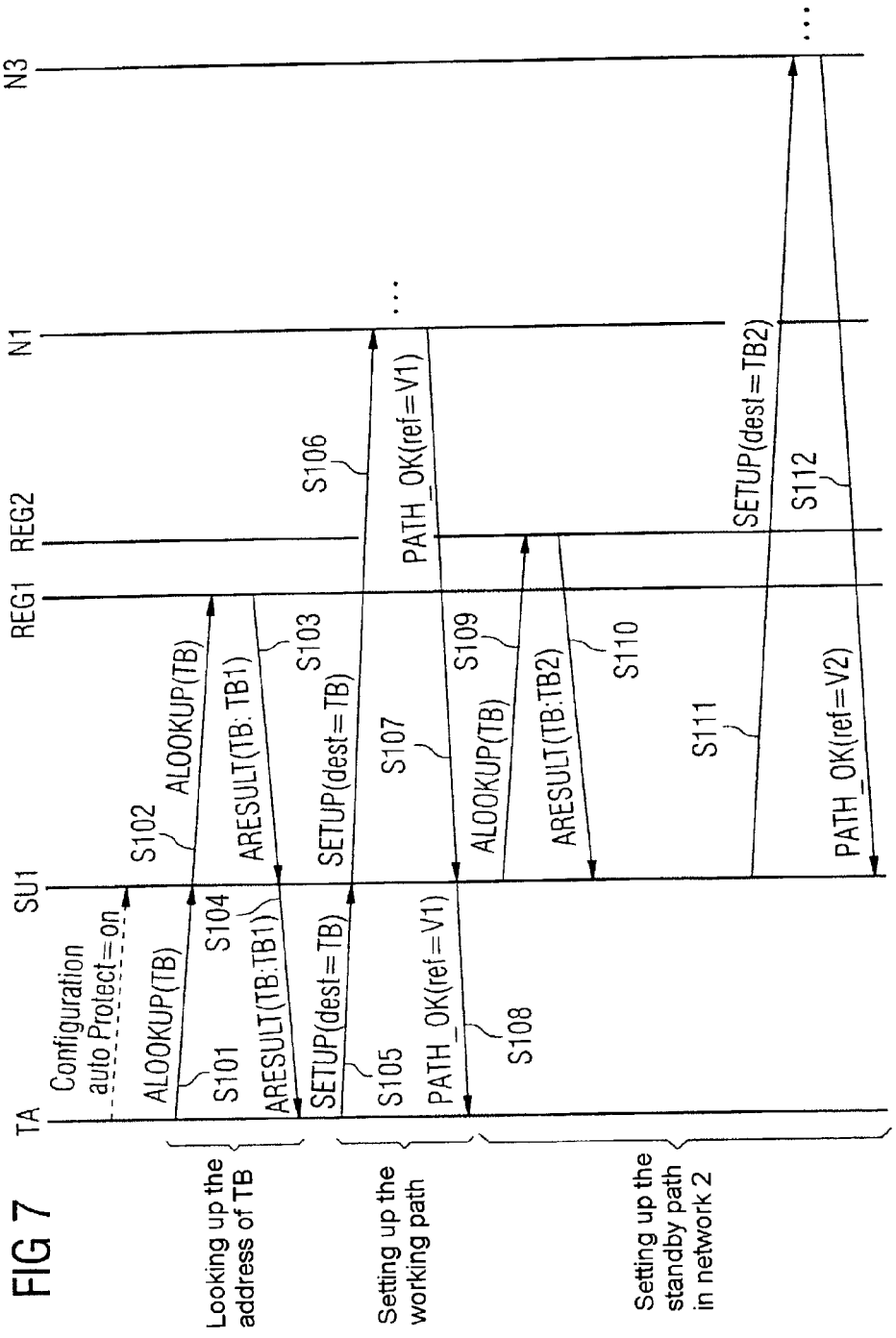

SIGNALING PROXY DEVICE FOR AUTOMATICALLY SETTING UP STANDBY PATHS IN OPTICAL NETWORKS

BACKGROUND OF THE INVENTION

The present invention relates to an optical communication network, a data connection switching unit for use in such a communication network, and an optical communication method.

Optical communication networks generally have a first transceiver from which optical signals are transferred to a second transceiver via a data connection with the interposition of a number of interconnected network node devices. Network node devices can be interconnected, for example, in each case via one or more optical conductors.

The data transmission within the communication network can be performed, for example, with the aid of optical WDM (wavelength division multiplex) binary signals. In this case, a number of wavelength-multiplexed, pulsed optical signals are transmitted via a single optical conductor.

In the communication networks currently used, the data connections used within the network are set up not via signaling signals sent via separate signaling channels, but via a central control device or a central network management.

For the purpose of connecting transceivers to such networks, it is possible to provide so-called protection switching units (PSUs) that, upon the occurrence of disturbances on a first data connection, cause the optical signals emitted by the first transceiver to be transmitted henceforth via a second data connection different from the first data connection.

It is an object of the present invention to make available a novel optical communication network, a novel data connection switching unit for use in an optical communication network, and a novel optical communication method.

SUMMARY OF THE INVENTION

In accordance with a basic idea of the present invention, an optical communication network is provided in which, via a number of interconnected network node devices of an optical transport network, data is transferred to a second transceiver via a first data connection via optical signals, characterized in that a data connection switching unit is connected between the first transceiver and one of the network node devices, which independently instigates the setting up of a second data connection between first and second transceivers by virtue of the fact that it sends a data connection setup signaling signal to the corresponding network node device in which information referring to the desired course of the second data connection is included.

The optical transport network is advantageously an ASON (automatically switched optical network)network. It is particularly preferred for the data connection switching unit to be connected to a network address storage device in which one or more optical network addresses assigned to the second transceiver in the address space of the optical transport network are stored.

The data connection switching unit for the first transceiver preferably fulfils a proxy function; for example, with reference to network address interrogation and/or (connection switching) signaling. For example, upon the occurrence of disturbances or excessively strong disturbances on the first data connection, the data connection switching unit can switch over, without influencing the first transceiver, automatically from the first data connection to the second (undisturbed or strongly disturbed) data connection.

Additional features and advantages of the present invention are described in, and will be apparent from, the following Detailed Description of the Invention and the Figures.

BRIEF DESCRIPTION OF THE FIGURES

FIG. 7 shows a schematic of the time sequence of signaling signals exchanged between the subscriber line unit shown in FIG. 6, the data connection switching unit, two network address storage devices and two network node devices.

DETAILED DESCRIPTION OF THE INVENTION

Figure 1:
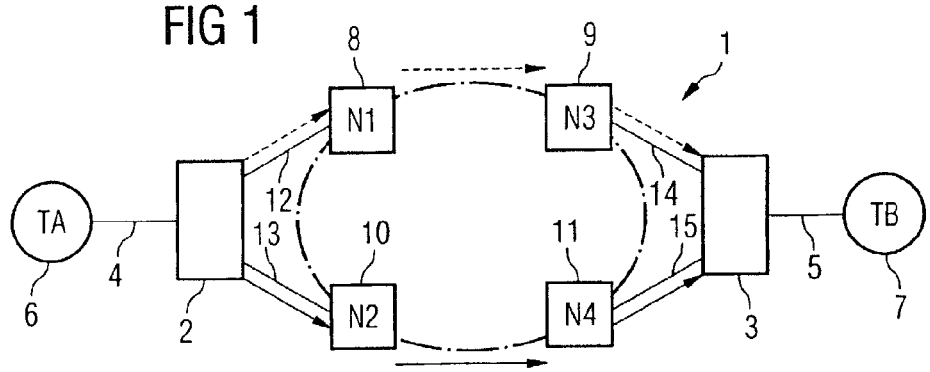
FIG. 1 shows a schematic of an optical communication network with standby data connection switching units in accordance with the prior art.

In accordance with FIG. 1, an optical communication network or optical transport network (OTN) 1 according to the prior art has a number of network node devices 8, 9, 10, 11, and a number of data connection switching units or PSUs (Protection Switching Unit) 2, 3, to which a subscriber line unit 6, 7 is connected in each case via corresponding optical conductors 4, 5. The first data connection switching unit 2 is connected via an optical conductor 12 to a first network node device 8, and via a further optical conductor 13 to a second network node device 10. In a corresponding way, the second data connection switching unit 3 is respectively connected via optical conductors 14, 15 to a third and fourth network node device 9, 11. The network node devices 8, 9, 10, 11 (and a multiplicity of further network node devices (not illustrated)) are interconnected within the optical transport network (OTN) 1 via a multiplicity of optical conductors.

In the case of the transport network (OTN) 1 shown in FIG. 1, the data connections respectively used in the transmission of data between the individual network node devices are set up by a central network management system.

Upon the occurrence of disturbances (or upon the occurrence of excessively strong disturbances) on a "working" data connection (illustrated in the representation in accordance with FIG. 1 by the arrows consisting of continuous lines) routed via the optical conductor 13 and the second (and fourth) network node device 10, 11, the data connection switching units 2, 3 then, instead of this, relay the optical signals emitted by a corresponding subscriber line unit 6, 7 via a "standby" data connection routed via the optical conductor 12, and the first (and third) network node device 8, 9 (illustrated in the representation in accordance with FIG. 1 by the arrows consisting of dashed lines).

Figure 2:
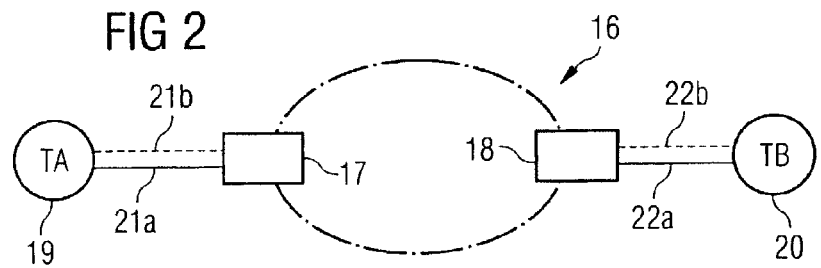
FIG. 2 shows a schematic of an automatically switched optical network (ASON).

By contrast with FIG. 1, FIG. 2 shows an automatically switched optical network or ASON network 16, which has a multiplicity of network node devices 17, 18, interconnected via corresponding optical conductors, and a number of subscriber line units 19, 20. The latter are connected via, in each case, one (or, for example, two) optical conductor 21a, 21b and 22a, 22b, respectively, to a corresponding final network node device 17, 18, use being made in each case of a first optical waveguide channel for transmitting useful signals, and of a second optical waveguide channel for transmitting signaling signals used for switching useful signals, for example.

Figure 3:
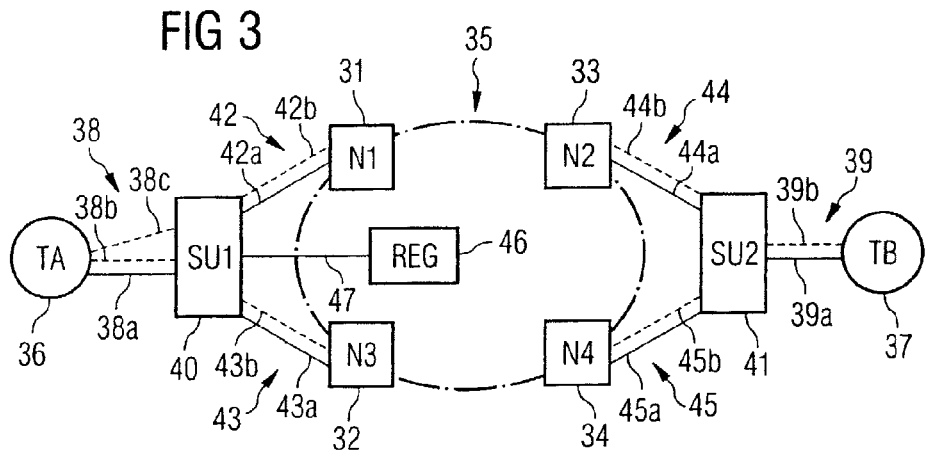
FIG. 3 shows a schematic of an optical communication network in accordance with a first exemplary embodiment of the present invention.

FIG. 3 shows an optical communication network 30 (here: an automatically switched optical network or ASON network) in accordance with a first exemplary embodiment of the present invention. This has a multiplicity of network node devices 31, 32, 33, 34 interconnected via an optical conductor network 35 (illustrated in the representation in accordance with FIG. 3 by a dash-dotted ellipse), and a multiplicity of subscriber line units 36, 37. The latter can be, for example, IP (Internet Protocol) routers with MPLS signaling.

Within the optical conductor network 35, each network node device 31, 32, 33, 34 is connected via, in each case, one or more optical conductor bundles to, in each case, a number of (for example, two, three or four) further network node devices 31, 32, 33, 34. In each case, one or more optical conductor bundles (running in parallel) are arranged in a pipe (laid entirely or partially underground, for example). Each optical conductor bundle has one or more optical conductors.

A WDM (wavelength division multiplex) data transmission method can be used for transmitting data between the first subscriber line unit 36 and the second subscriber line unit 37.

Because of the wavelength division multiplexing, it is possible to transmit a number of different, pulsed optical binary signals simultaneously in different wavelength regions over each optical conductor present in the network (the signals serving, for example, to transmit data between a number of further subscriber line units (not illustrated here) as well as to transmit data between the first and second subscriber line units 36, 37).

As is further shown in FIG. 3, the first and second subscriber line units 36, 37 are connected to a data connection switching unit (SU) 40, 41 via one or more optical conductor 38, 39, in each case. The first data connection switching unit 40 is connected to a corresponding (first) network node device 31 via one or more optical conductors 42, and to a corresponding (second) network node device 32 via one or more further optical conductors 43. In a corresponding way, the second data connection switching unit 41 is connected via one or more optical conductors 44 to a corresponding (third) network node device 33, and via one or more further optical conductors 45 to a corresponding (fourth) network node device 34.

Used in each case between the subscriber line units 36, 37 and the data connection switching units 40, 41 respectively connected thereto, and between the data connection switching units 40, 41 and the network node devices 31, 32, 33, 34 respectively connected thereto are, in each case, a first optical waveguide channel 38a, 39a, 42a, 43a, 44a, 45a for transmitting useful signals (illustrated in the representation in accordance with FIG. 3 by continuous lines), and a second optical waveguide channel 38b, 39b, 42b, 43b, 44b, 45b for transmitting signaling signals, which are explained in further detail below (illustrated in the representation in accordance with FIG. 3 by dashed lines). In addition, a further optical waveguide channel 38c, which is used to transfer (address interrogation) signaling signals, is provided between the first subscriber line unit 36 and the first data connection switching units 40.

The different, parallel optical waveguide channels 38a, 39a, 42a, 43a, 44a, 45a and 38b, 39b, 42b, 43b, 44b, 45b can be switched respectively via a number of (for example, two or three) different optical conductors or, for example, via one and the same optical conductor (for example, via wavelength division or time division multiplexing).

The optical communication network 30 also has a central network address storage device 46 of a network address directory services server computer (REG or Registry) that is connected in each case to the data connection switching units 40, 41 via an optical waveguide channel 47 routed via a corresponding further optical conductor.

The optical network address of a specific subscriber line unit 37 in the address space of the optical communication network 30 is not known to the remaining subscriber line units 36. Consequently, before the setting up of an appropriate data connection, the first step is, with the interposition of the data connection switching device 40, to use the appropriate subscriber line unit 36 to interrogate the optical network address of that subscriber line unit 37 to which a connection is to be set up, doing so via appropriate signaling signals.

Figure 4:
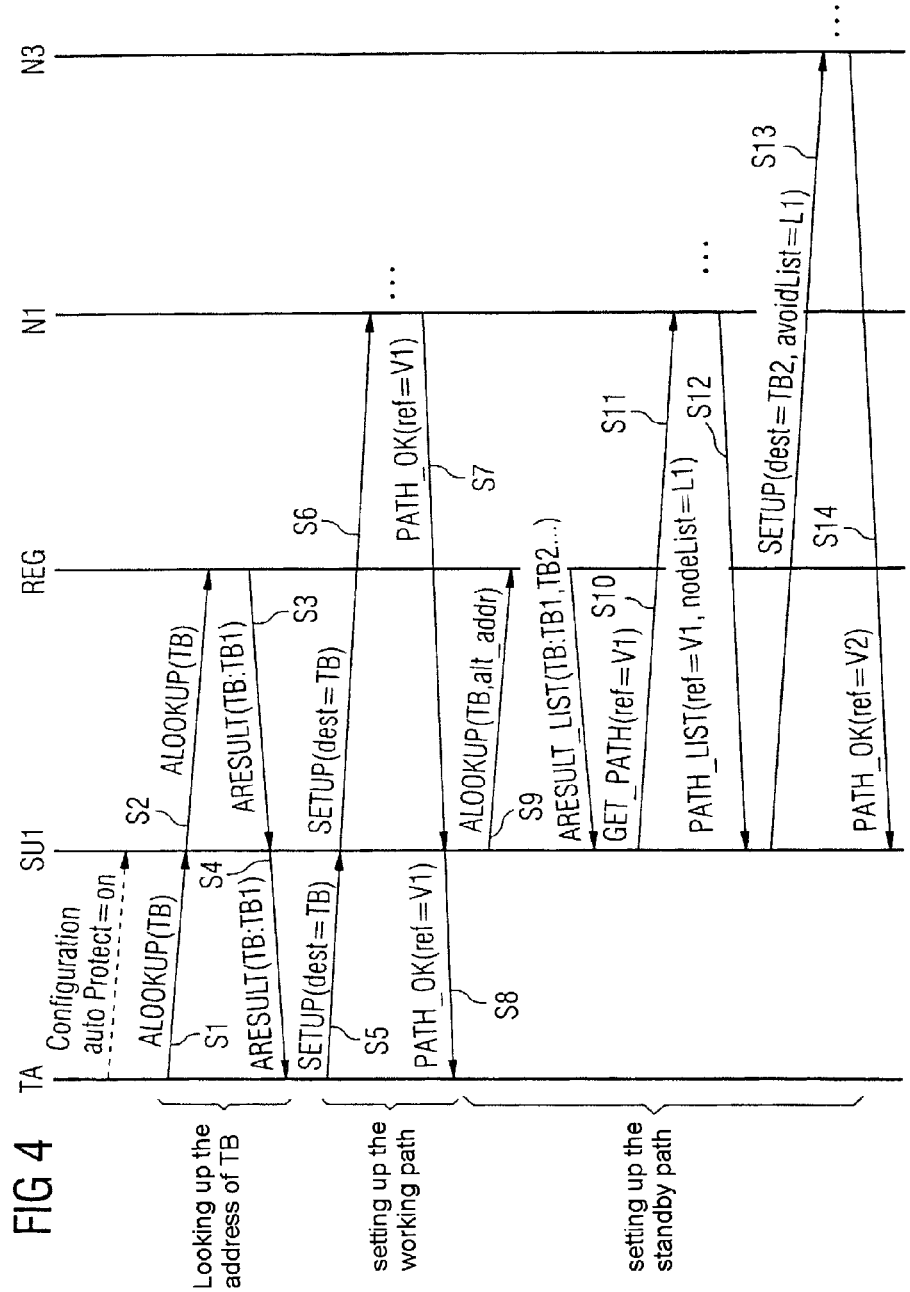
FIG. 4 shows a schematic of the time sequence of signaling signals exchanged between the subscriber line unit shown in FIG. 3, the data connection switching unit, the network address storage device and two network node devices.

In accordance with FIG. 4, the first step for this purpose is to send a first signaling signal S1 (ALOOKUP(TB)) to the data connection switching unit 40 (SU1) from the first subscriber line unit (TA) 36 via the optical waveguide channel 38c via appropriate optical binary pulses. Included in this address request signaling signal S1 is an identifier TB that, in the address space of the subscriber line unit 36, identifies the destination subscriber line unit 37.

The identifier TB is stored in a storage device (not illustrated) of the switching unit 40 under the control of a control device (likewise not illustrated) of the data connection switching device 40. Thereupon, a second signaling signal (ALOOKUP(TB)) corresponding to the above-named first signaling signal S1 is sent to the central network address storage device 46 (REG) from the data connection switching unit 40 via the optical waveguide channel 47. The network address TB1 corresponding to the identifier TB in the address space of the optical communication network 30 is read out of the network address storage device under the control of the associated network address directory service server computer.

The network address directory service server computer then causes a third signaling signal S3 (ARESULT (TB: TB1)) to be sent to the data connection switching unit 40 via the optical waveguide channel 47. The network address TB1 of the destination subscriber line unit 37 is, inter alia, included in this address check-back signaling signal S3.

The network address TB1 is stored in the storage device of the data connection switching unit 40. The next step is to send the subscriber line unit 37 a fourth signaling signal S4 (ARESULT (TB: TB1)) which contains, inter alia, the network address TB1 of the destination subscriber line unit 37 and corresponds to the above-named address check-back signaling signal S3, from the data connection switching unit 40 via the optical waveguide channel 38c. The network address TB1 is then stored, while being assigned to the subscriber line unit identifier TB, in a storage device of the subscriber line unit 36.

In the address interrogation operation described, the data connection switching unit 40 functions as a "proxy", such that the subscriber line unit 36 cannot distinguish whether it is connected directly to a network node device of the optical conductor network 35, or to the data connection switching unit 40.

In accordance with FIG. 4, the next step for setting up a (first, unassured "working") data connection between first and second subscriber line units 36, 37 from the first subscriber line unit (TA) 36 is to use corresponding optical binary pulses transmitted via the optical waveguide channel 38b to send a fifth signaling signal S5 (SETUP (dest=TB)) to the data connection switching unit (SU1) 40. The above-named identifier TB identifying the destination subscriber line (TB) or the optical network address TB1 thereof is included in this (connection setup request) signaling signal S5.

Thereupon, a sixth (connection setup request) signaling signal S6 (SETUP (dest=TB)) containing the destination subscriber line identifier TB (or the destination subscriber line network address TB1) is sent to the network node device 31 from the data connection switching unit 40 via the optical waveguide channel 42b.

The next step is for a network node control device (not illustrated) to select a connection identifier (here: V1) identifying the connection to be set up, and to store it in a network node storage device (likewise not illustrated).

The network node device 31 (or the network node control device) then selects one of the further network node devices connected to it as that network node device via which the connection is to be extended. The next step is for the network node control device to cause a further signaling signal corresponding to the above-named signaling signal S6 to be sent from the network node device 31 to the selected further network node device, etc.

In this way, a "working" data connection, routed via the path TA-SU1-N1-N2-SU2-TB, is set up successively between the first subscriber line unit 36 and the second subscriber line unit 37.

If the connection has been set up successfully as far as the second subscriber line unit 37, this is communicated to the second data connection switching unit 41 by the second subscriber line unit 37 via a signaling signal sent via the optical waveguide channel 39b, where this communication is relayed to the network node device 33 via a connection setup confirmation signaling signal sent via the optical waveguide channel 44b, and, from there, to the network node device 31 via further connection setup confirmation signaling signals. Via the optical waveguide channel 42b, the network node device 31 sends a connection setup confirmation signaling signal S7 (PATH_OK (ref=V1)) to the data connection switching unit 40, which signal includes, inter alia, the above-named connection identifier V1.

Figure 5:
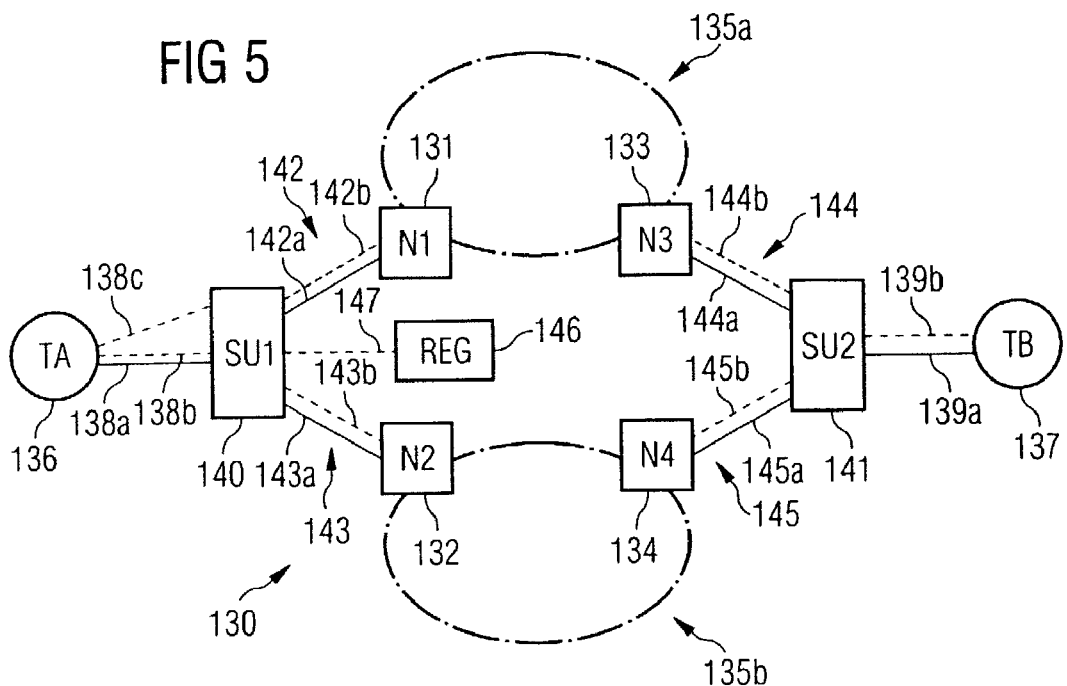
FIG. 5 shows a schematic of an optical communication network in accordance with a second exemplary embodiment of the present invention.

Via the optical waveguide channel 38b, the data connection switching unit 40 then sends the connection setup confirmation signaling signal S8 (PATH_OK (ref=V1)) shown in FIG. 5, and likewise included in the above-named connection identifier V1, to the first subscriber line unit 36. The connection identifier is stored in the subscriber line storage device under the control of a control device (not illustrated) of the first subscriber line unit.

As explained above, the "working" data connection switched via the "working" path TA-SU1-N1-N2-SU2-TB is set up with the interposition of the data connection switching unit 40. Because of its "proxy" function, the subscriber line unit 36 cannot distinguish whether the "working" data connection is switched directly via a network node device of the optical conductor network 35, or, indirectly, via the data connection switching unit 40.

The next step is for the data connection switching unit 40 to cause, in addition to the above-named "working" data connection routed via the path TA-SU1-N1-N2-SU2-TB, a further "standby" data connection, routed via a "standby" path, to be set up to the second subscriber line unit 37.

The "standby" path is to run disjointly within the optical conductor network 35 with reference to the above-named "working" path; that is to say, different paths between the individual network node devices 31, 32, 33, 34 are to be used in each case for the "standby" and the "working" paths. Alternatively, or in addition, the "standby" data connection is to be distinguished in another way from the "working" data connection: for example, in the case of both connections, the path can certainly run sequentially via two identical network node devices 31, 32, 33, 34, but the aim thereby is to make use in each case of two different optical conductor bundles or optical conductors arranged in different pipes (duct diversity). Alternatively, or in addition, it is certainly possible in the case of both connections to make use between two network node devices 31, 32, 33, 34 of an identical pipe, but different optical conductor bundles arranged in the same pipes can be used, or, for example, an identical optical conductor bundle, but different optical conductors contained therein (fiber diversity). Alternatively, or in addition, the "working" and the "standby" data connections can also run through different buildings in each case (building diversity).

Before the setting-up of the "standby" data connection, the data connection switching unit 40 firstly interrogates an alternative optical network address TB2 for the second subscriber line unit 37 at the network address storage device (REG) 46. In accordance with FIG. 4, for this purpose the data connection switching unit 40 sends a ninth signaling signal (ALOOKUP(TB,alt_addr)) to the central network address storage device (REG) 46 via the optical waveguide channel 47. The signal includes, inter alia, the identifier TB identifying the destination subscriber line (TB). In reaction to the receipt of the signaling signal S9, the abovementioned optical destination subscriber line network address TB1 corresponding to the above-named identifier TB is read out from the network address storage device (REG) 46 under the control of the associated network address directory service server computer, as are one or more further optical network addresses TB2, differing therefrom, of the destination subscriber line 37 in the address space of the optical communication network 30.

The network address directory service server computer then causes a tenth signaling signal S10 (ARESULT_LIST (TB: TB1, TB2, . . . )) to be sent to the data connection switching unit 40 via the optical waveguide channel 47. Included in this address list check-back signaling signal S10 are the various optical network addresses TB1, TB2, . . . of the destination subscriber line unit 37.

Sending the above-named ninth and tenth signaling signals S9, S10 is omitted in the case of an alternative exemplary embodiment. Instead of this, all the optical network addresses TB1, TB2, . . . of the second subscriber line unit 37 are directly interrogated as early as during the step of "looking up the address of TB" (compare FIG. 4) by sending signals corresponding to the ninth and tenth signaling signals S9, S10 in place of the above-named second and third signaling signals S2, S3 (ALOOKUP(TB)), ARESULT(TB: TB1)) from the data connection switching unit 40. One of the optical network addresses (for example, the network address TB1) is then used to set up the "working" data connection, and another optical network address (for example, the network address TB2) is used to set up the "standby" data connection.

The network addresses TB1, TB2, . . . received by the network address storage device (REG) 46 are stored in the storage device of the data connection switching unit 40.

In accordance with FIG. 4, the control device of the data connection switching unit 40 thereupon causes an eleventh signaling signal S11 (GET_PATH (ref=V1)) to be sent from the latter to the network node device 31 via optical binary pulses transmitted via the optical waveguide channel 42b. This serves the purpose of interrogating information, stored in the storage device of the network node device 31 (or elsewhere in the optical conductor network 35), referring to the resources used by the "working" data connection (that is to say, information referring to the respectively used "working" path, or to the respectively used pipes, optical conductor bundles, optical conductors, etc.).

Included inter alia in the (resource request) signaling signal S11 is the identifier V1 identifying the "working" data connection set up.

If the network node device 31 receives the resource interrogation signaling signal S13, its control device reads out the above-named information stored in the network node storage device and referring to the resources used by the "working" data connection (for example, the identifiers of the network nodes via which the "working" path is routed, or their optical network addresses).

In accordance with FIG. 4, a further signaling signal S12 (PATH_LIST (ref=V1, nodeList=L1)) is sent to the data connection switching unit 40 from the network node device 31 via the optical waveguide channel 42b. As well as the identifier V1 identifying the "working" data connection, this includes, inter alia, a list with the identifiers of the network nodes via which the "working" path is routed.

After receipt of the resource communication signaling signal S12, the control device of the data connection switching unit 40 causes the "standby" data connection to be set up. In accordance with FIG. 4, for this purpose a signaling signal S13 (SETUP (dest=TB2; avoidList=L1)) is sent to the network node device (N3) 32 from the data connection switching unit 40 via optical binary pulses transmitted via the optical waveguide channel 43b. Included in this (standby connection setup request) signaling signal S13 is one of the above-named (alternative) network addresses TB2 of the destination subscriber line unit (TB) 37, as well as the resources to be avoided in setting up the "standby" data connection (here: a list of the identifiers of the network nodes via which the "working" path is routed, and which are to be avoided by the "standby" path).

After receipt of the standby connection setup request signaling signal S13, the network node control device of the network node device 32 selects a connection identifier (here: V2) identifying the "standby" data connection to be set up, and stores it in the network node storage device. The network node device 32 (or the control device thereof) then selects one of the network node devices connected to the network node device 32 as that network node device via which the "standby" data connection is to be extended, specifically in such a way that the "standby" path thereby produced is disjoint relative to the above-named "working" path (that is to say here: that the next network node device used is not included in the above-named list of network node devices to be avoided).

The next step is for the network node control device to cause a further standby connection setup request signaling signal, which corresponds to the above-named signaling signal S13, to be sent from the network node device 32 via a signaling optical waveguide channel to the selected further network node device, which signal includes, inter alia, the above-named network address TB2 of the destination subscriber line unit, as well as the resources to be avoided in setting up the "standby" data connection.

In this way, a "standby" data connection, routed via the path N3-N4-SU2-TB, is set up successively to the second subscriber line unit 37.

If the connection has been set up successfully as far as the second subscriber line unit 37, this is communicated to the second data connection switching unit 41 by the second subscriber line unit 37 via a signaling signal sent via the optical waveguide channel 39b, from where this communication is relayed to the network node device 34 via a connection setup confirmation signaling signal sent via the optical waveguide channel 45b, and, from there, to the network node device 32 via further connection setup confirmation signaling signals. Via the optical waveguide channel 43b, the network node device 32 sends a connection setup confirmation signaling signal S14 (PATH_OK (ref=V2)) to the data connection switching unit 40, which signal includes, inter alia, the above-named connection identifier V2 of the "standby" data connection.

The connection identifier V2 is stored, under the control of the control device of the data connection switching unit 40, in the storage device thereof.

The connection identifiers V1, V2 are used when emitting the actual useful data via the optical waveguide channels 42a, 43a to identify the connection respectively to be used.

The above-named "standby" data connection can be used, for example, for data transmission only whenever disturbances on the "working" data connection occur (or the disturbances on the "working" data connection become excessively large). Consequently, it is possible for the data connection switching unit 40 to switch the data transmission over quickly to the "standby" data connection in the event of (strong) disturbances occurring on the "working" data connection.

For this purpose, the quality of the data transmitted via the "working" data connection is measured under the control of the control device of the first and/or the second data connection switching unit 40, 41 (for example, by determining the bit error rate thereby occurring, such as by emitting a pseudo-random bit sequence via the first data connection switching unit 40, and comparing the received bit sequence with an expected bit sequence stored in advance in the storage device of the second data connection switching unit). The quality of the data transmission via the "working" data connection (for example, in the case of SDH or Ethernet transmission) also can be established by evaluating the check sum data transmitted together with the (useful) data in the respective transmission frame.

Instead of setting up the "standby" data connection (with the aid of the above-named signals S9, S10, S11, S12, S13, S14) directly and automatically after setting up the "working" data connection, the "standby" data connection can, for example, not be set up until the quality of the data transmitted via the "working" data connection falls below a first, predetermined threshold value. If the data quality drops still further (for example, below a second, predetermined threshold value), the data transmission is switched over from the "working" data connection to the "standby" data connection as appropriate by the data connection switching unit 40, as described above.

Alternatively, the "standby" data connection can, for example, not be set up until after a collapse of the "working"

data connection. The data connection switching unit 40 can thus emulate the quick new setup of a connection for a transport network that is actually not designed therefor. Sending the signals S11 and S12 can be omitted in the case of this alternative; the data connection switching unit 40 then switches the data transmission over to the "standby" data connection from the "working" one whenever it has received the signal S14 (PATH_OK (ref=V2)).

In the case of the above-named exemplary embodiment and of the above-named alternative exemplary embodiments, the connection setup attempt can be repeated several times if the setting up of the "standby" data connection was unsuccessful. The "working" data connection already can be used during this time, but is then not yet protected.

Because of the "proxy" function of the data connection switching unit 40, the subscriber line unit 36 cannot distinguish whether the data connection switching unit 40 is switching the data further via the "working" data connection, or via the "standby" one.

FIG. 5 shows an optical communication network 130 in accordance with a second exemplary embodiment of the present invention. This is designed in a way corresponding to the communication network 30 shown in FIG. 3, except that, instead of being connected to a single optical conductor network of a single operating company, the first and second data connection switching units 140, 141 are connected to two optical transport networks 135*a*, 135*b* that are separate organizationally (illustrated in the representation in accordance with FIG. 5 by two dash-dotted ellipses). In a way corresponding to the optical conductor network 35 shown in FIG. 3, transport networks 135*a*, 135*b* are automatically switched optical networks or ASON networks.

The first data connection switching unit 140 is connected to a corresponding network node device 131 of the first transport network 135*a* via one or more optical conductors 142, and to a corresponding network node device 132 of the second transport network 135*b* via one or more further optical conductors 143. In a corresponding way, the second data connection switching unit 141 is connected to a (second) final network node device 133 of the first transport network 135*a* via one or more optical conductors 144, and to a corresponding (second) final network node device 134 of the second transport network 135*b* via one or more further optical conductors 145.

Used respectively between the subscriber line units 136, 137 and the data connection switching units 140, 141 respectively connected thereto, and between the data connection switching units 140, 141 and the network node devices 131, 132, 133, 134 respectively connected thereto, are a first optical waveguide channel 138*a*, 139*a*, 142*a*, 143*a*, 144*a*, 145*a* for transmitting useful signals (illustrated in the representation in accordance with FIG. 5 by continuous lines), and a second optical waveguide channel 138*b*, 139*b*, 142*b*, 143*b*, 144*b*, 145*b* for transmitting signaling signals (illustrated in the representation in accordance with FIG. 5 by dashed lines).

Furthermore, a further optical waveguide channel 138*c* that is used to transfer (address interrogation) signaling signals is provided between the first subscriber line unit 136 and the first data connection switching unit 140.

The optical communication network 130 also has for both transport networks 135*a*, 135*b* a central network address storage device 146 of a central network address directory service server computer (REG or Registry), which is connected, in each case, to the data connection switching units 140, 141 via an optical waveguide channel 147 routed via an appropriate further optical conductor.

The optical network addresses of the subscriber line units 136, 137 are stored, jointly for both transport networks 135*a*, 135*b*, in the network address space in the central network address storage device 146. Therefore, they can be interrogated accordingly in a fashion corresponding identically to the first exemplary embodiment in accordance with FIG. 4 via signaling signals S1, S2, S3, S4 from the respective subscriber line unit 136. Apart from looking up the address of the destination subscriber line unit 37 (signals S1, S2, S3, S4), it is also possible to set up the "working" and the "standby" paths in a correspondingly identical way as explained in conjunction with FIG. 4 for the first exemplary embodiment (that is to say, via appropriate signals S5, S6, S7, S8 or S9, S10, S11, S12, S13, S14).

Figure 6:
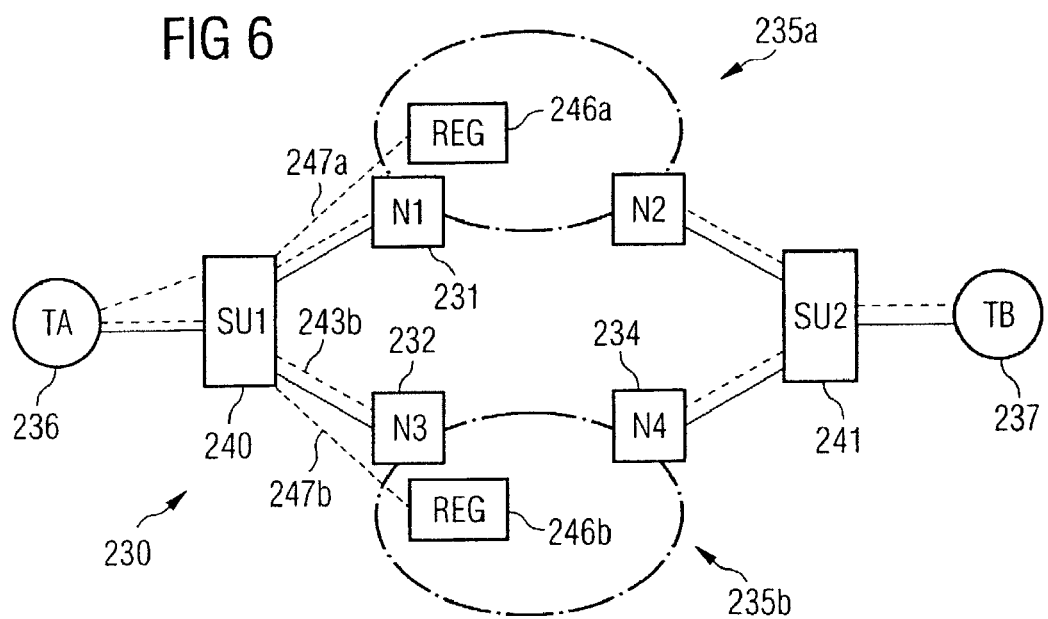
FIG. 6 shows a schematic of an optical communication network in accordance with a third exemplary embodiment of the present invention.

An optical communication network 230 in accordance with a third exemplary embodiment of the present invention is shown in FIG. 6. This is designed in a way corresponding to the communication network 130 shown in FIG. 5 (that is to say, the first and second data connection switching units 240, 241 are connected to two organizationally separate optical transport networks 235*a*, 235*b*), except that two separate network address storage devices 246*a*, 246*b* for the networks 235*a*, 235*b* are provided instead of a single central network address storage device 246 for both transport networks 235*a*, 235*b*. Different optical network addresses respectively stored in the first or second network address storage device 246*a*, 246*b* are therefore respectively assigned in each network 235*a*, 235*b* to each subscriber line unit 236, 237.

The first network address storage device 246*a* of a network address directory service server computer (REG1) of the first transport network 235*a* is connected to the data connection switching unit 240 via an optical waveguide channel 247*a*. The switching unit 240 is connected in a corresponding way via a further optical waveguide channel 247*b* to the second network address storage device 246*a* of a network address directory service server computer (REG2) of the second transport network 235*b*.

In the optical communication network 230 shown in FIG. 6, the optical network address of the destination subscriber line unit 237 is looked up in a fashion corresponding identically to the first and second exemplary embodiments, specifically in accordance with FIG. 7 via signaling signals S101, S102, S103, S104 (that are identical to the signals S1, S2, S3, S4 shown in FIG. 4) exchanged between the first subscriber line unit 236, the first data connection switching unit 240, and the first network address storage device 246.

Furthermore, the "working" path is designed in an identical way to the case of the optical communication networks 30, 130 shown in FIGS. 3 and 5 (and specifically, in accordance with FIG. 7, via signaling signals S105, S106, S107, S108 exchanged between the first subscriber line unit 236, the first data connection switching unit 240, and the first network node device 231 of the first transport network 235*a* (which are identical to the signals S5, S6, S7, S8 shown in FIG. 4)).

A signaling signal S109 (ALOOKUP(TB)) is sent to the second network address storage device 246*b* (REG2) from the data connection switching unit 240 via the optical waveguide channel 247*b* in order to set up the "standby" data connection. This includes, inter alia, the identifier TB that identifies the destination subscriber line unit 237, in the address space of the subscriber line unit 236.

Thereupon, the network address TB2 corresponding to the identifier TB in the address space of the second transport network 235*b* is read out of the second network address storage device 246b (REG2) under the control of the associated network address directory service server computer.

The network address directory service server computer then causes a further signaling signal S110 (ARESULT (TB: TB2)) to be sent to the data connection switching unit 240 via the optical waveguide channel 247b. Included in this address check-back signaling signal S110 is, inter alia, the above-named network address TB2 of the destination subscriber line unit 237.

Thereupon, a (connection setup request) signaling signal S111 (SETUP (dest=TB2)) including the network address TB2 of the destination subscriber line unit 237 is sent to a network node device 232 of the second transport network 235b from the data connection switching unit 240 via the optical waveguide channel 243b. The next step is for a network node control device (not illustrated) to select the connection identifier (not yet allocated) (here: V2) identifying the connection to be set up, and to store it in a network node storage device (likewise not illustrated).

A "standby" data connection, routed via the path N3-N4-SU2-TB, is then set up successively to the second subscriber line unit 237 in accordance with the above representation by sending a further connection setup request signaling signal from the network node device 232.

If the connection has been successfully set up, this is firstly communicated to the second data connection switching unit 241 from the second subscriber line unit 237 via an appropriate signaling signal, then to the network node device 232 via a number of further signaling signals, for example of the network node device 234, and finally to the first data connection switching unit 240. In accordance with FIG. 7, for this purpose the network node device 232 sends a connection setup confirmation signaling signal S112 (PATH_OK (ref=V2)) to the data connection switching unit 240 via the optical waveguide channel 243b, which signal includes, inter alia, the above-named connection identifier V2.

In the case of further, alternative exemplary embodiments (not illustrated), the subscriber line unit 36, 136 shown in FIGS. 3 and 5, respectively, is connected directly to the network address storage device 46, 146 (for example, via the optical waveguide channels 38c, 138c). In this case, the proxy function of the data connection switching unit 40, 140 is omitted when looking up the network address TB1 of the destination subscriber line unit 37, 137. In this case, during setting up of the "standby" data connection, the first data connection switching unit 40, 140 uses a signal corresponding to the signal S9 to interrogate a network address TB2 that is an alternative to the network address TB 1 (instead of the signal S9 ALOOKUP(TB, alt_addr), use is then made of, for example, the signal S9' ALOOKUP(TB1, alt_addr)).

Alternatively, or in addition, the data connection switching unit 40, 140 shown in FIGS. 3 and 5 can generate a dedicated connection identifier V1' different from the connection identifier V1, and transfer it to the subscriber line unit 36, 136 via a signal S8' (PATH_OK(ref=V1')) corresponding to the signal S8 (PATH_OK(ref=V1)).

Furthermore, in the case of the exemplary embodiment shown in FIG. 6, it is possible, in a fashion corresponding to the exemplary embodiments shown in FIGS. 3 and 5, to make use of signals corresponding to the signals S11, S12 and S13 (GET_PATH (ref=V1), PATH_LIST (ref=V1, nodeList=L1) and SETUP(dest=TB2, avoidList=L1)) in accordance with FIG. 4, in order to rule out that the "working" and the "standby" data connections are possibly no longer mutually disjoint in a third transport network (for example, run via two identical network node devices).

In the case of further alternative exemplary embodiments, the working connection setup confirmation signaling signal S8 or S108 (PATH_OK(ref=V1)), for example, is not emitted until the "standby" connection has been successfully set up.

Moreover, instead of the above-named data connection switching units 40, 41, 140, 141, it is possible to make use of data connection switching units corresponding to these, in order to protect subregions of a transport network (and not, as in the case of the above-named exemplary embodiments, the entire transport network in each case). It is possible for this purpose to connect such data connection switching units, for example, upstream of further network node devices (not illustrated in FIGS. 3, 5, 6) within the respective transport network, for example, and thus to protect parts (that are particularly at risk of failure) of a path within a transport network.

In the case of the exemplary embodiments described in conjunction with FIGS. 3, 5 and 6, it has been assumed that the actual useful data transmitted via the "working" or the "standby" data connection, and the signaling information (for example, the signals S1, S2, S3, S4, etc.) are transmitted in each case via appropriate optical pulses and, in each case, via one and the same optical conductor. In the case of alternative exemplary embodiments, by contrast, the signaling information is transmitted via separate optical conductors and/or separate paths, by comparison with the useful information. It is likewise conceivable to transmit the signaling information via a separate network; for example, an electrical transmission network. Likewise, instead of as illustrated between the affected network nodes, the exchange of the signaling information also can be performed between the respectively affected network nodes and one or more central network nodes in which processing of the signaling information is carried out.

Indeed, although the present invention has been described with reference to specific embodiments, those of skill in the art will recognize that changes may be made thereto without departing from the spirit and scope of the present invention as set forth in the hereafter appended claims.

The invention claimed is:

1. An optical communication network, comprising:
a plurality of interconnected network node devices of an optical transport network;
first and second transceivers; and
a data connection switching unit;
wherein data is transmitted to the second transceiver from the first transceiver via a working data connection via optical signals; and
wherein the data connection switching unit is connected between the first transceiver and one corresponding network node device, with the data connection switching unit independently instigating setting up of a standby data connection between the first transceiver and the second transceivers by sending a data connection set up signaling signal to the corresponding network node device in which information referring to a desired connection path of the standby connection is included,
wherein the standby data connection is to run at least partly disjointly relative to the working data connection and the standby data connection runs at least partially via a path other than the working data connection.

2. An optical communication network as claimed in claim 1, further comprising a network address storage device, wherein the data connection switching unit is connected to the network address storage device in which at least one optical network address assigned to the second transceiver in an address space of the optical transport network is stored.

3. An optical communication network as claimed in claim 2, wherein the data connection switching unit interrogates an optical network address stored in the network address storage device and assigned to the second transceiver by sending an appropriate interrogation command signal via a separate signaling channel.

4. An optical communication network as claimed in claim 3, further comprising a further signaling channel with a further network address storage device, wherein the data connection switching unit is connected separately to the signaling channel via the further signaling channel, wherein at least one optical network address assigned to the second transceiver in an address space of a further optical transport network is stored in the further network address storage device.

5. An optical communication network as claimed in claim 1, wherein the data connection setup signaling signal sent to the corresponding network node device is sent via a signaling channel that is different from a useful data channel via which actual useful data is sent to the corresponding network node device pursuant to the standby data connection.

6. An optical communication network as claimed in claim 1, wherein the working data connection is switched via a network node device that is connected to the data connection switching unit and is different from the corresponding network node device connected to the data connection switching unit via which the standby data connection is switched.

7. An optical communication network as claimed in claim 6, wherein the transmission of data by the first transceiver to the second transceiver is switched over by the data connection switching unit from the working data connection to the standby data connection whenever disturbances occur on the working data connection.

8. An optical communication network as claimed in claim 1, wherein the information included in the data connection setup signaling signal includes information referring to a path which is used by the working data connection but is avoided by the standby data connection.

9. An optical communication network as claimed in claim 1, wherein the information included in the data connection setup signaling signal includes an optical network address assigned to the second transceiver in an address space of the optical transport network.

10. An optical communication network as claimed in claim 1, wherein the first transceiver is a subscriber line unit.

11. An optical communication network as claimed in claim 1, wherein optical signals are transmitted via the working data connection and the standby data connection via wavelength-division-multiplexed optical signals.

12. A data connection switching unit in an optical communications network, the network including a plurality of interconnected network node devices of an optical transport network as well as first and second transceivers, wherein data is transmitted to the second transceiver from the first transceiver via a working data connection via optical signals, and wherein the data connection switching unit is connected between the first transceiver and one corresponding network node device, the data connection switching unit comprising parts for independently instigating setting up of a standby data connection between the first transceiver and the second transceiver by sending a data connection setup signaling signal to the corresponding network node device in which information referring to a desired path of the standby data connection is included, and wherein the standby data connection is to run at least partly disjointly relative to the working data connection and the standby data connection runs at least partially via a path other than the working data connection.

13. A data connection switching unit as claimed in claim 12, wherein the data connection switching unit can undertake conversion between different signaling protocols.

14. An optical communication method, the method comprising the steps of:
    providing a plurality of interconnected network node devices of an optical transport network;
    providing first and second transceivers;
    providing a data connection switching unit;
    transferring data via a working data connection via optical signals from the first transceiver to the second transceiver via the plurality of interconnected network node devices; and
    setting up a standby data connection between the first transceiver and the second transceiver upon instigation of the data connection switching unit switched between the first transceiver and one corresponding network node device, wherein the data connection switching unit sends a data connection setup signaling signal to the corresponding network node device in which information referring to a desired path of the standby data connection is included, and
    wherein the standby data connection is to run at least partly disjointly relative to the working data connection and the standby data connection runs at least partially via a path other than the working data connection.

* * * * *